(12) United States Patent
Satake et al.

(10) Patent No.: US 6,392,731 B1
(45) Date of Patent: May 21, 2002

(54) LIQUID CRYSTAL DISPLAY DEVICE

(75) Inventors: Tetsuya Satake; Takahiro Nishioka; Kazuko Wakita; Tadashi Saito; Hiroyuki Fuchigami; Tetsuyuki Kurata, all of Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/583,765

(22) Filed: May 31, 2000

(30) Foreign Application Priority Data

Mar. 2, 2000 (JP) .......................................... 2000-057043

(51) Int. Cl.[7] ............................................ G02F 1/1343
(52) U.S. Cl. ......................................... 349/141; 349/143
(58) Field of Search .................................. 349/141, 143

(56) References Cited

U.S. PATENT DOCUMENTS 6,147,731 A * 11/2000 Shibahara ................... 349/110

FOREIGN PATENT DOCUMENTS

| JP | 7-191336 | 7/1995 |
| JP | 9-105908 | 4/1997 |
| JP | 9-258269 | 10/1997 |

* cited by examiner

Primary Examiner—Kenneth Parker
Assistant Examiner—David Chung
(74) Attorney, Agent, or Firm—Leydig, Voit & Mayer, Ltd.

(57) ABSTRACT

A liquid crystal display device with an In-panel switching system mode includes a conductive body for adjusting an electric field, disposed between elongated electrodes such that the conductive member is electrically isolated from the elongated electrodes.

22 Claims, 11 Drawing Sheets

LIQUID CRYSTAL DISPLAY DEVICE

BACKGROUND OF THE INVENTION

1. Field of the Invention

The present invention relates to a liquid crystal display device, and more particularly to an active matrix type liquid crystal display device which adopts an In-plane switching system mode as a display mode having a wide viewing angle.

2. Description of the Related Art

The In-plane switching (hereinafter also called IPS) mode which is one of display modes of an active matrix type liquid crystal display device has extremely wide viewing angle characteristics compared with the twisted nematic (hereinafter also called TN) mode which is currently the main stream. The IPS mode can realize a contrast ratio of not less than 10 at a viewing angle of 80° in upward and downward directions as well as in left and right directions without using a particular optical compensation film. Accordingly, it is expected that the IPS mode will be popularly used by display devices having wide screens such as OA monitors and televisions.

FIGS. 3(a) and 3(b) are schematic views showing the constitution and the operation principle of the conventional typical liquid crystal display device adopting the IPS mode, wherein FIG. 3(a) shows an OFF state and FIG. 3(b) shows an ON state. In the drawing, numeral 2 indicates comb-like electrodes (only central portions of a pair of comb-like electrodes are shown), numeral 3 indicates liquid crystal molecules, numeral 5 indicates an electrode substrate, numeral 6 indicates a counter substrate, numeral 7 indicates an alignment layer, numeral 8a indicates a polarization film disposed at the counter substrate side, numeral 8b indicates a polarization film disposed at the electrode substrate side, numeral 9a indicates a light transmission axis of the polarization film 8a, numeral 9b indicates a light transmission axis of the polarization film 8b, numeral 10 indicates a backlight, and numeral 11 indicates a direction of an applied electric field. Besides the above-mentioned constitution, between the alignment layer 7 and the electrode substrate 5 as well as between the alignment layer 7 and the comb-like electrodes 2, insulation films may be interposed. Further, the comb-like electrodes 2 may be formed on the counter substrate side. As the material of the comb-like electrodes, an opaque material such as chromium or aluminum is used. This is because, the liquid crystal molecules rise up on the electrode due to the electric field in the vertical direction and hence, when the transparent material is used, the viewing angle characteristics are deteriorated.

Here, an alignment layer treatment such as rubbing is applied to the surface of the alignment layer such that the alignment direction makes an angle of θ1 relative to the long side direction of the comb-like electrodes and hence, the liquid crystal molecules in the OFF state where the voltage is not applied take a homogeneously aligned state and such an angle θ1 is set to approximately 5° in the drawing. Further, the liquid crystal is tilted at approximately 3° in an up and down direction toward the counter substrate 6 side and this tilting is called a pretilt angle. Further, the polarization film 8a has its light transmission axis arranged in parallel with the alignment direction of the liquid crystal, while the polarization film 8b is arranged such that the film 8b and 8a become crossed nicols. That is, in FIG.3(a), the transmission axis 9a of the polarization film 8a becomes equal to the direction of the rubbing treatment.

In the ON state shown in FIG. 3(b), the twist deformation is induced in the liquid crystal layer due to the transverse electric field 11 applied perpendicular to the long side direction of the comb-like electrodes. Due to the birefringence effect of the liquid crystal layer caused by the twist deformation, the liquid crystal layer wholly or partially transmits the light and the transmittance thereof is controlled by the magnitude of the twisting of the liquid crystal.

The detail of such an operation principle is, for example, described in the paper "Liquid Crystals 22(4), pp. 379–390 (1997)" written by M. Oh-e et al. Further, although the drawing shows the case that the Np type liquid crystal is used, there may be a case that the Nn type liquid crystal is used. Compared to the case which uses the Np type liquid crystal, in the case which uses the Nn type liquid crystal, the alignment layer treatment is performed in a 90-degrees rotated direction.

However, in the conventional active matrix type liquid crystal display device which adopts the IPS mode as the display mode, since the electric field is applied radially to the distal ends of the comb-like electrodes, there has been a problem that a reverse twisted region where the liquid crystal is twisted in the reverse direction is partially formed and hence, a disclination occurs in the periphery of the region.

FIG. 4 is a view which schematically shows the comb-like electrodes used in the liquid crystal display device which adopts the IPS mode. In the drawing, numeral 4 indicates the alignment treatment direction, numerals 11a, 11b, 11c indicate the direction of electric field, and numeral 13 indicates the disclination. In the central portions of the comb-like electrodes 2, as depicted by the direction 11c of electric field, the electric field is applied in the direction substantially perpendicular to the long side direction of the comb-like electrodes and hence, no reverse twist occurs. At the distal ends of the comb-like electrodes 2, however, as depicted by the directions 11a, 11b of electric field, the electric field is applied radially and hence the reverse twisting region 12 is formed by the electric field having the direction 11a of the electric field. Although the electric field having the direction 11b of the electric field is applied radially, as shown in the drawing, since the applying direction is aligned with the rubbing direction, such an application of electric field does not form the reverse twisting region.

Further, as shown in FIG. 4, in the conventional IPS system, the homogeneous alignment layer treatment is performed in the direction which makes θ2 relative to the long sides of the comb-like electrodes to control the twisting direction of the liquid crystal layer. However, there has been a problem that in case such homogeneous alignment layer treatment is performed, the viewing angle characteristics such as transmittance, contrast and the like do not become symmetrical in up and down directions as well as in left and right directions.

FIG. 5 shows the viewing angle dependency of the contrast in case the direction of the alignment layer treatment is set to 10°, wherein numeral 20 indicates equi-contrast lines of the contrast ratio 10 and numeral 21 indicates equi-contrast lines of the contrast ratio 15. As can be understood from the drawing, are rotated by the angle θ3 (=10°) and hence, the equi-contrast lines are asymmetrical in up and down directions as well as in left and right directions. In the conventional liquid crystal display device which uses the comb-like electrodes, the viewing angle characteristics are not less than 80° in an up and down direction as well as in a left and right direction and the contrast ratio is not less than 10. However, if the equi-contrast lines are symmetric in an up and down direction as well as in a left and right direction, substantial viewing angle characteristics as the display device are further enhanced.

In addition, in case the homogeneous alignment layer treatment is performed in the proper alignment layer treatment direction with the use of the comb-like electrodes shown in FIG. 4, the liquid crystal molecules are twisted in one direction and hence, it gives rise to a phenomenon that the color is changed corresponding to the direction of viewing angle.

FIG. 6 is a schematic view showing the change of color depending on the viewing angle, wherein numeral 30 indicates the bluing direction (direction seen in bluish color) and numeral 31 indicates the yellowing direction (direction seen in yellowish color). Corresponding to the direction to see liquid crystal molecules, the apparent retardation is changed thus giving rise to the bluish color or the yellowish color. The detail of this phenomenon is described in the paper "Jpn. J. Appl. Phys. 36 (1A/B), pp. L27–29 (1997)" written by S. Aratani et al.

With respect to the above-mentioned two tasks, that is, the asymmetry of the viewing angle characteristics and the color change corresponding to specific viewing angle directions, Japanese Laid-Open Patent Publication 191336/1995, Japanese Laid-Open Patent Publication 105908/1997 and Japanese Laid-Open Patent Publication 258269/1997 disclose measures which can resolve such tasks by changing the shape and arrangement of the comb-like electrodes. In all cases, the viewing angle characteristics become symmetrical in up and down directions as well as in left and right directions and a color change corresponding to the specific viewing angle directions can be suppressed. These methods, however, change the shape of the electrodes and hence, aperture ratio is decreased in most of these measures to resolve tasks. Further, although a method which prevents a decrease of aperture ratio by bending the electrodes has been proposed, this suffers from a problem that color filter substrates which have the bent pixel arrangement become necessary and this pushes up the manufacturing cost.

Accordingly, it is an object of the present invention to j provide a liquid crystal display device which can overcome these problems and can suppress disclination without decreasing aperture ratio.

SUMMARY OF THE INVENTION

The liquid crystal display device according to the present invention includes an electrode substrate provided with at least a pair of elongated electrodes, a counter substrate which is arranged such that the counter substrate faces the electrode substrate in an opposed manner and a liquid crystal sandwiched between the electrode substrate and the counter substrate, wherein the liquid crystal display device is constituted such that the device controls the direction of the liquid crystal by an electric field generated between a pair of elongated electrodes so as to perform a display, a pair of such elongated electrodes are arranged such that a long side of one elongated electrode faces a long side of the other elongated electrode in an opposed manner with a given distance, and a conductive member adjusting electric field is disposed between the elongated electrodes such that the conductive member is electrically separated from a pair of elongated electrodes.

Further, according to the present invention, a plurality of one elongated electrodes and a plurality of other elongated electrodes may be arranged so as to constitute comb teeth portions of comb-like electrodes.

Still further, according to the present invention, the rubbing treatment direction of the substrates may be set to be in parallel with long sides of elongated electrode portions and the conductive member may be arranged in a tilted manner by making an angle of not less than 5° and not more than 20° relative to the long sides of elongated electrode.

Additionally, according to the present invention, the liquid crystal may be made of a twistable liquid crystal.

Still additionally, the conductive member may be made of a metal thin film of approximately up to several 10 nm besides translucent material such as ITO (Indium Tin Oxide) or $SnO_2$. This conductive member is capable of performing its effect even when the conductive member has a width of not more than 3 $\mu$m, a thickness of not more than 100 nm and a pretilt angle of not more than 3°.

DETAILED DESCRIPTION OF THE PREFERRED EMBODIMENTS

Embodiment 1

Figure 1:
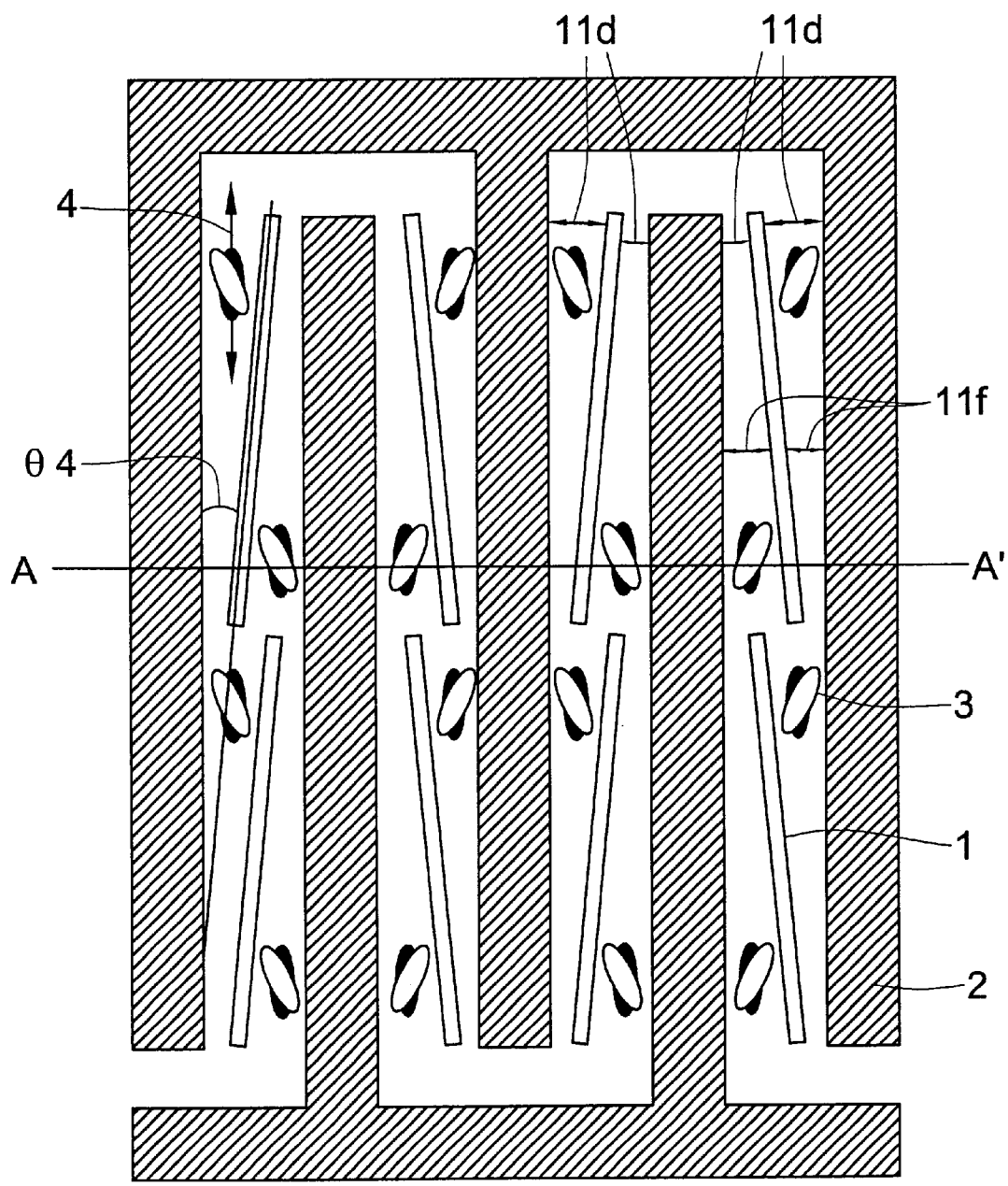
FIG. 1 is a schematic view showing a pixel portion of the liquid crystal display device of the present invention.

FIG. 1 is a schematic view showing a pixel portion of a liquid crystal display device which forms one embodiment of the present invention. In the liquid crystal display device according to the present invention, to enhance viewing angle characteristics, such as transmittance, contrast, and the like, the rubbing treatment direction is set to a direction (direction shown by an arrow 4) parallel to a long side direction of comb-shaped electrodes 2. Accordingly, in the OFF state where no voltage is applied to the liquid crystal 3, the liquid crystal 3 is homogeneously aligned parallel to the long sides of the comb-like electrodes 2 as shown by black matted portions. Due to such a constitution, when the conductive member 1 is tilted by an angle θ4 relative to the direction of the long side of the comb-like electrode between the comb-like electrodes, in the ON state, the electric field in the vicinity of the surface of the electrode substrate 5 is formed in the directions indicated by numerals 11d, 11e and 11f and hence, the liquid crystal 3 is twisted in the direction shown by white matted portions in a stable manner. Therefore, the formation of the reverse twisted region at the distal ends of the comb-like electrodes can be suppressed.

Figure 2A:
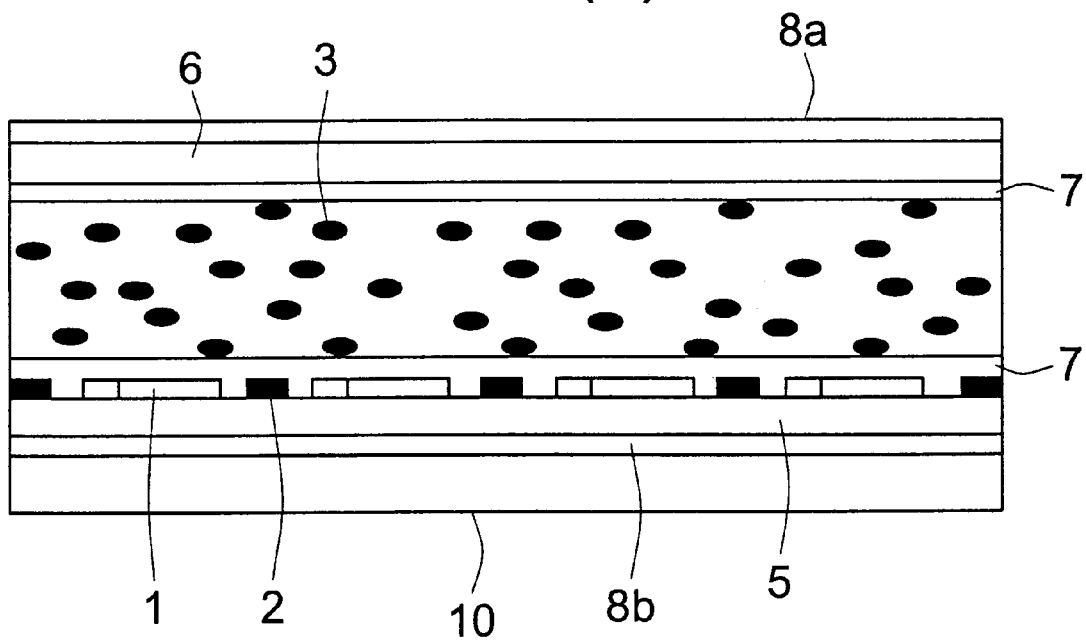
FIGS. 2(a) and (b) are cross-sectional views showing a pixel portion of the liquid crystal display device of the present invention.
Figure 2B:
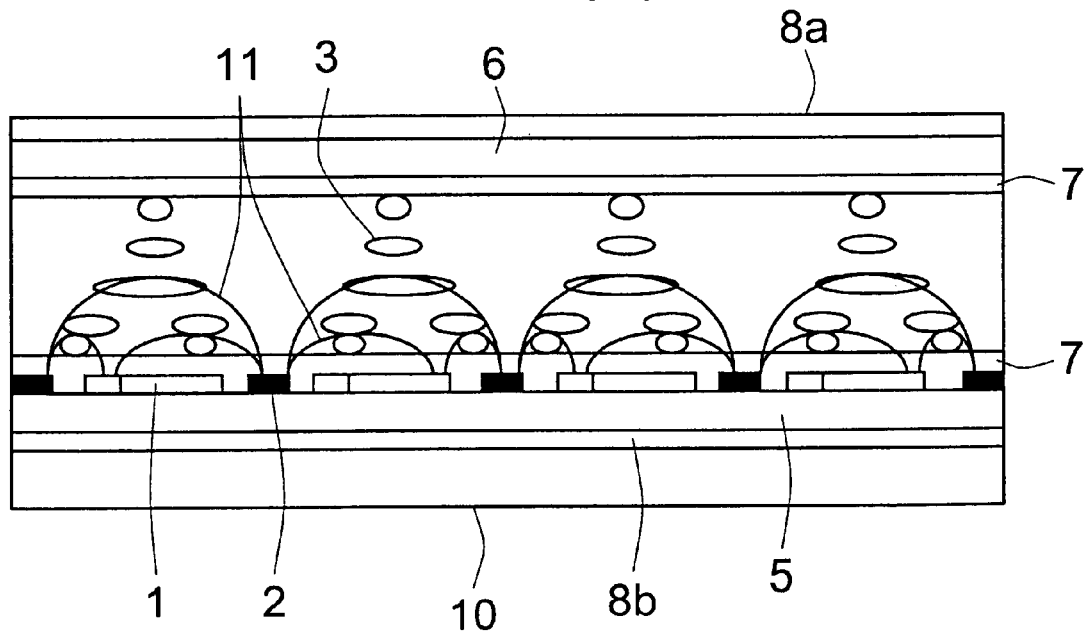
Figure 3A:
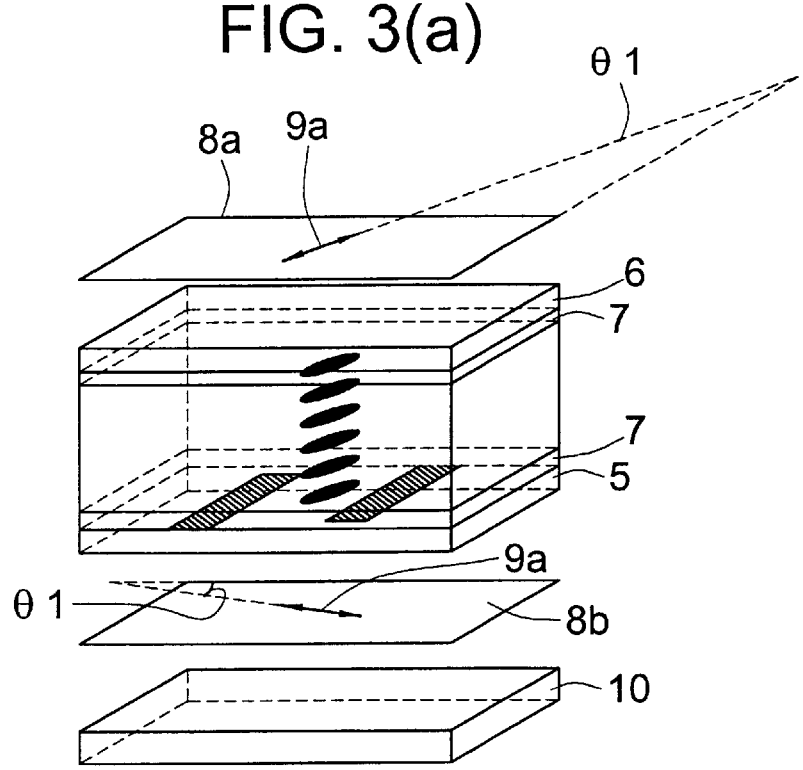
FIGS. 3(a) and (b) are schematic views showing an IPS mode liquid crystal display device and an operation principle thereof.
Figure 3B:
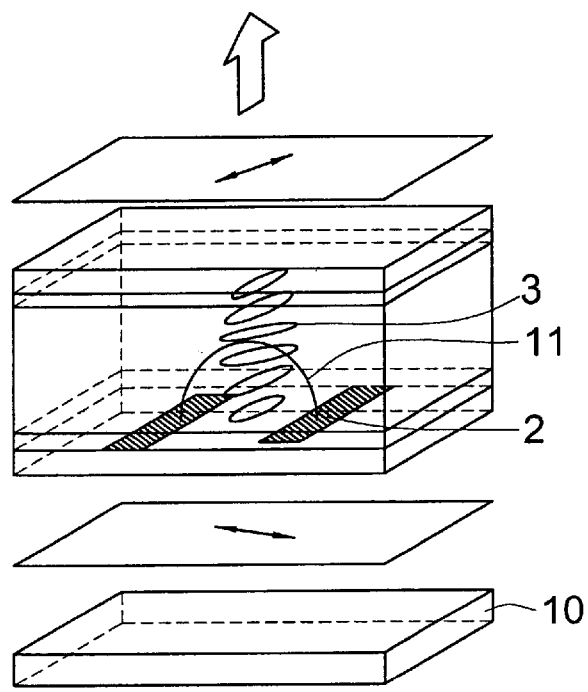
Figure 4:
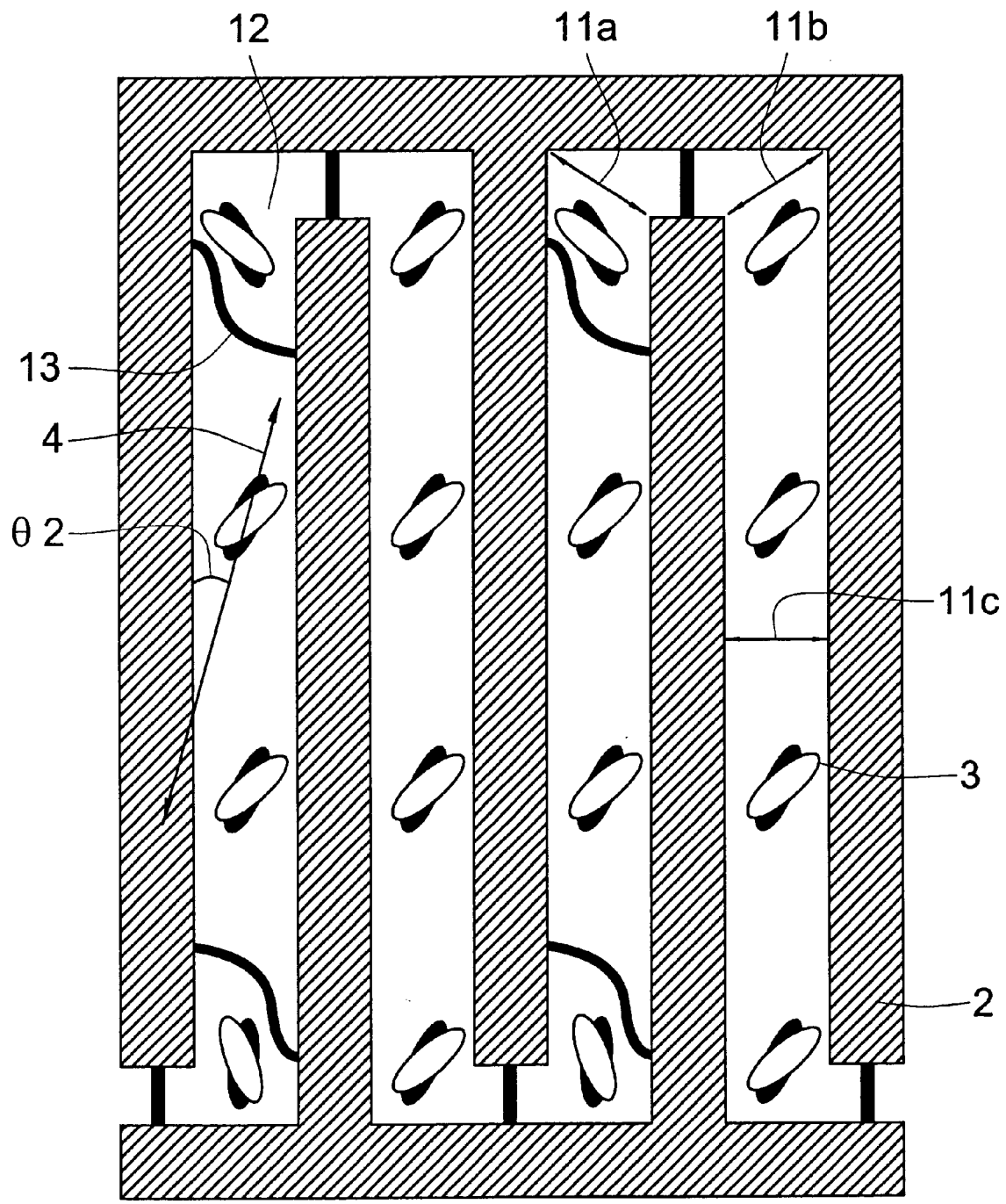
FIG. 4 is a schematic view showing the pixel portion of the conventional liquid crystal display device.
Figure 5:
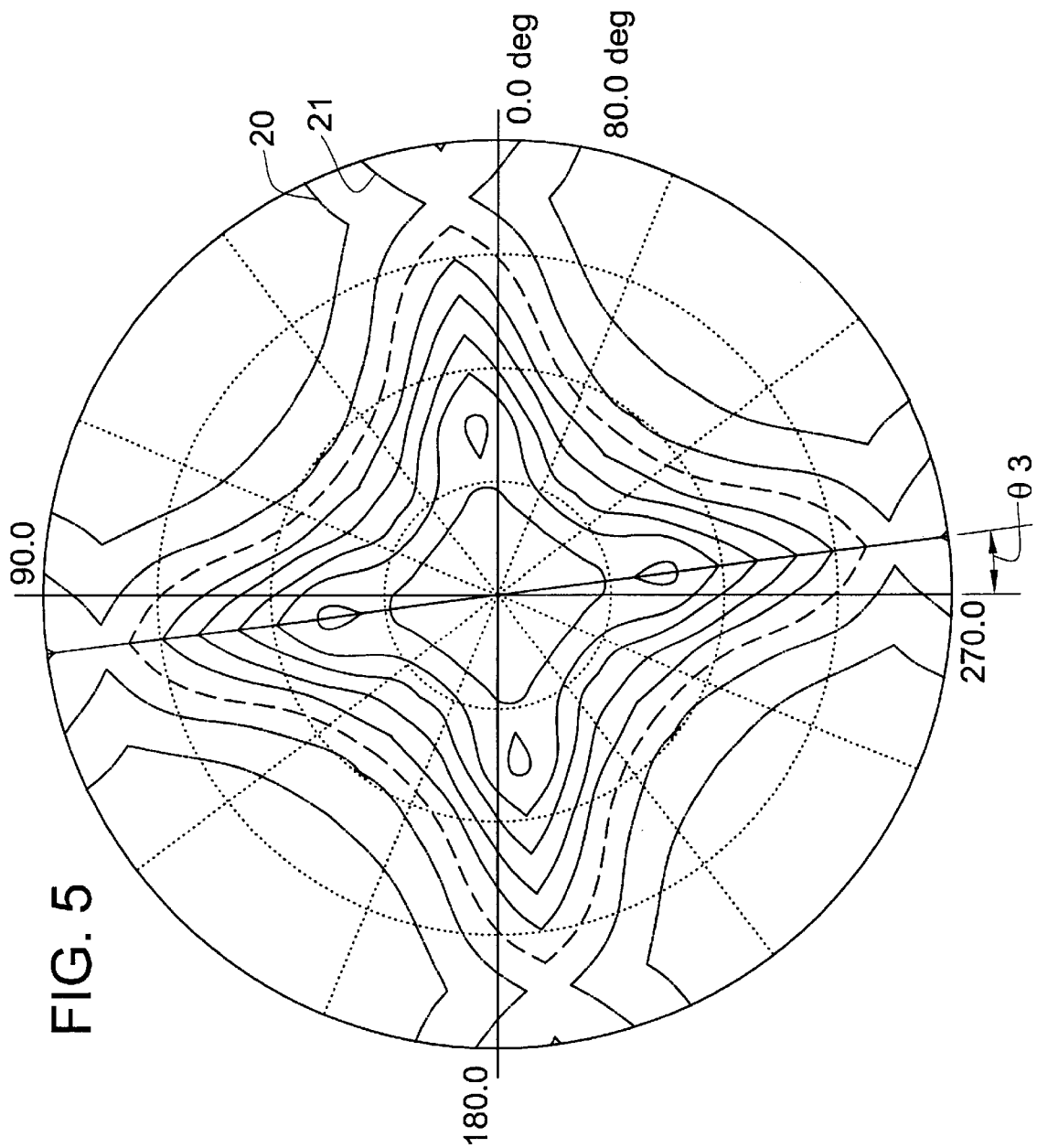
FIG. 5 is a view showing the viewing angle characteristics of the conventional IPS mode liquid crystal display device.
Figure 6:
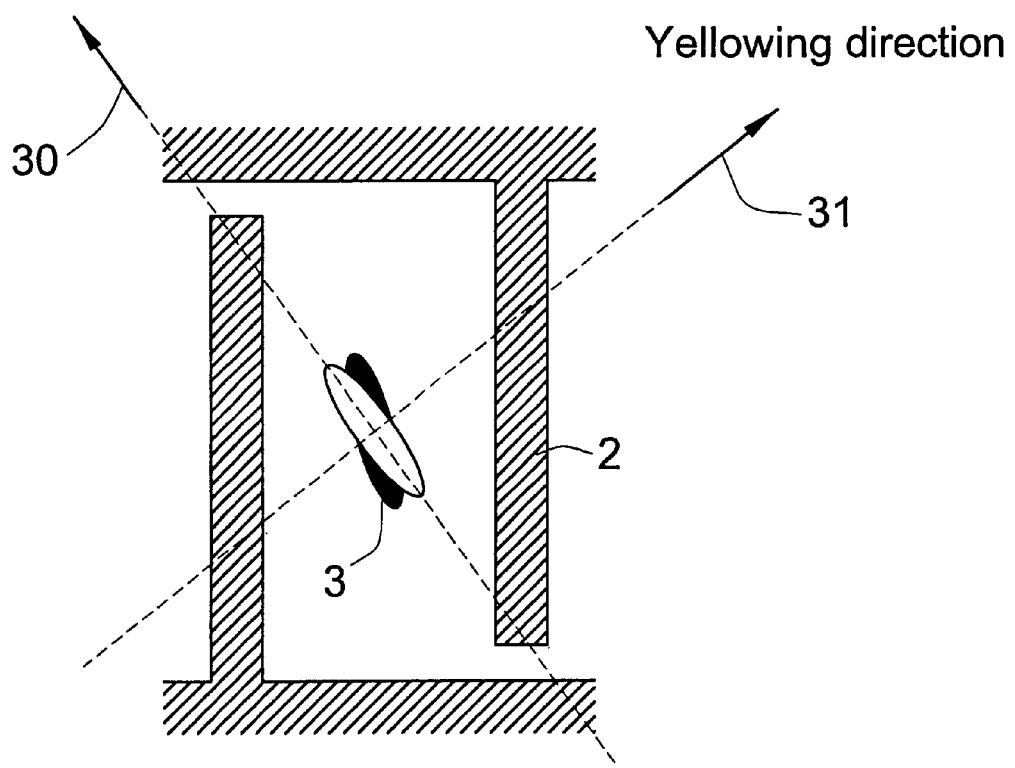
FIG. 6 is a view explaining the color change seen in specific directions in the IPS mode liquid crystal display device.

FIG. 2(a) and FIG. 2(b) are cross-sectional views showing the pixel portion of the liquid crystal display device which is an example of the embodiment of the present invention. FIG. 2(a) shows the OFF state where liquid crystal molecules 3 are homogeneously aligned as shown by black matted portions. Further, FIG. 2(b) shows the ON state where the electric fields are generated not only between the comb-like electrodes 2 but also between the comb-like electrodes 2 and the conductive members 1 in the vicinity of the surface of the electrode substrate 5. Due to the electric fields which are formed between the comb-like electrodes 2 and the conductive members 1, the liquid crystal gives rise to a stable twisting thereof in a constant direction. Then, the twisting of the liquid crystal is further largely increased by the strong electric field formed between the comb-like electrodes 2.

The constitution and the method for manufacturing the liquid crystal display device (pixel size: 100 $\mu$m×300 $\mu$m) of the present embodiment are as follows. Firstly, the comb-like electrodes 2 and the conductive members 1 are formed by sputtering and patterning chromium with photolithography on the electrode substrate 5. In the comb-like electrodes, the elongated electrode portions have a length of 250 $\mu$m, a width of 5 $\mu$m and a thickness of 100 nm respectively. The distance between a pair of opposing elongated electrode portions which face each other in an opposed manner is 15 $\mu$m. The size of the conductive members 1 is set to a width of 1 $\mu$m, a length of 120 $\mu$m, and a thickness of 80 nm. The long sides of the conductive members 1 make an angle θ4 of 5° relative to the long sides of the comb-like electrodes. A horizontal alignment layer AL1000 of JSR Ltd. is formed on the comb-like electrodes 2 and the conductive members 1 by a transfer method (flexography). Further, a horizontal alignment layer AL1000 of JSR Ltd. is also formed on the counter substrate 6 by the transfer method (flexography). Both substrates are subjected to the homogeneous alignment layer treatment by rubbing them in the alignment layer treatment direction indicated by an arrow 4, that is, in the direction parallel to the long sides of the comb-like electrodes. Subsequently, these substrates are combined while sandwiching resin-made spacers between them such that a gap between them becomes 4.0 $\mu$m and a p type liquid crystal having a double refractive index anisotropy Δn of 0.08 (589 nm, 20° C.) and a dielectric anisotropy Δε of +12.0 is injected into the gap. Then, the polarization film 8b having a transmission axis perpendicular to the long side direction of the comb-like electrodes is adhered to the electrode substrate 5 side and the polarization film 8a which becomes the "crossed nicols" state relative to the polarization film 8b is adhered to the counter electrode 6 side. Subsequently, a backlight 10 is disposed at the electrode substrate 5 side so as to prepare the liquid crystal display device. The pretilt angle in the used alignment film and the used liquid crystal is 2°.

Figure 7:
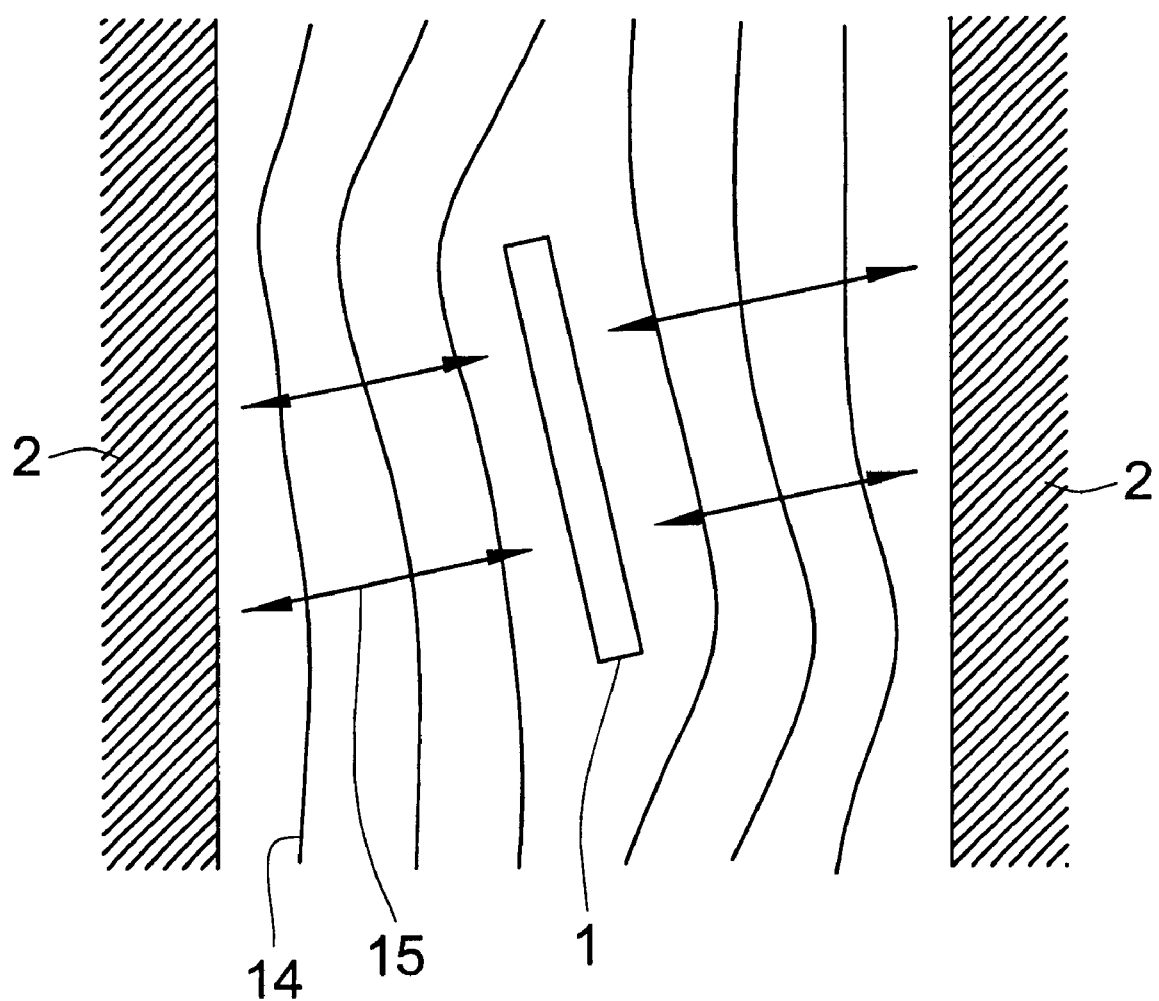
FIG. 7 is a schematic view showing the state of the electric field around the conductive member in the present invention.

FIG. 7 shows the distribution of the equi-potential lines and the direction of the applied electric field around the conductive member 1 in the vicinity of the surface of the electrode substrate 5 when the liquid crystal display device is at the On state. In the drawing, numeral 14 indicates the equi-potential lines and numeral 15 indicates the direction of the applied electric field. As can be understood from the drawing, in the vicinity of the surface of the electrode substrate 5, the equi-potential lines 14 between the electrodes are aligned in parallel with the long side direction of the conductive member 1 due to the conductive member 1 formed between the comb-like electrodes 2, and the applied electric field direction 15 is not perpendicular to the long sides of the comb-like electrodes 2. Accordingly, even when the alignment layer treatment direction is parallel to the long sides of the electrodes (perpendicular in case of using n type liquid crystal), the liquid crystal layer is uniformly twisted (in the clockwise direction in the drawing) so that the twisting direction of the liquid crystal layer can be controlled in a stable manner.

With respect to the liquid crystal display device having the above-mentioned constitution, the aligning condition of the liquid crystal molecules are observed by using a polarizing microscope. From the result of the experiment, it has been confirmed that, in the OFF state, the liquid crystal molecules 3 are aligned in the alignment layer treatment direction as indicated by black matted portions in FIG. 1 and that, in case the voltage is applied, the twisting deformation is generated in the direction controlled by the direction of the conductive member 1 (direction indicated by white matted portions in FIG. 1).

Figure 8:
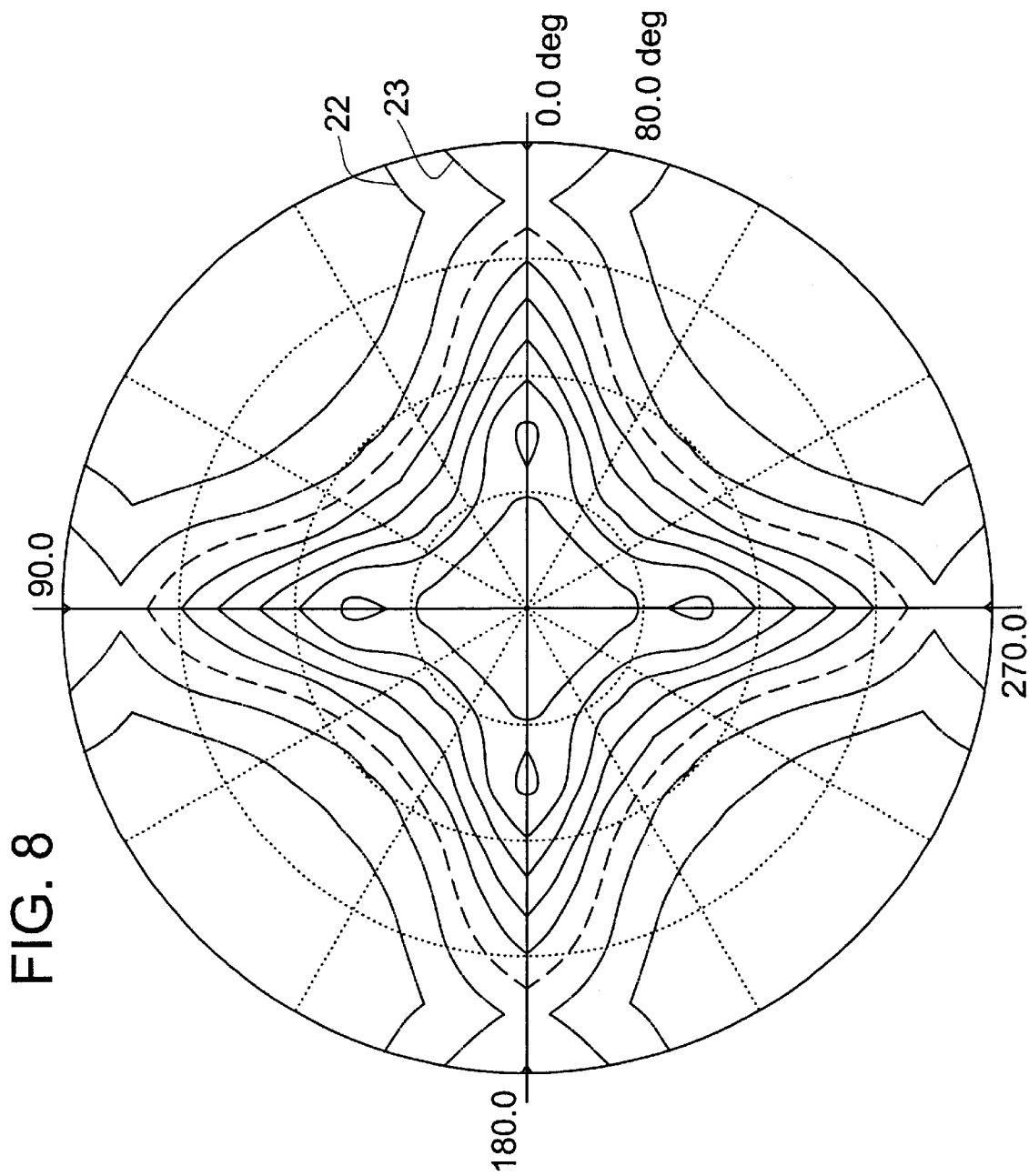
FIG. 8 is a view showing viewing angle characteristics of the liquid crystal display device of the present invention.

Further, FIG. 8 shows the viewing angle characteristics of the liquid crystal display device of the present invention, wherein numeral 22 indicates equi-contrast lines at a contrast ratio of 10 and numeral 23 indicates equi-contrast lines at a contrast ratio of 15. EZ contrast 160 D made of ELDIM Ltd. is used to measure the viewing angle. As a result, the equi-contrast lines become symmetric in an up and down direction as well as in a left and right direction. The contrast ratio of 15 is achieved at 80° in an up and down direction as well as in a left and right direction. Further, no color change is observed in all directions.

Although the conductive members 1 are arranged on the electrode substrate 5 on which the comb-like electrodes are formed in the embodiment 1, the conductive members 1 may be formed on the surface of the counter electrode 6 at relative positions which correspond to the comb-like electrodes. Due to such a constitution, as in the case of the embodiment 1, the viewing angle characteristics which are symmetric in an up and down direction as well as in a left and right direction can be realized.

Further, although the conductive member 1 is made of chromium having a width of 1 $\mu$m, a length of 120 $\mu$m and a thickness of 80 nm in the embodiment 1, the conductive member 1 may be formed of a transparent ITO (Indium Tin Oxide) having a width of 3 $\mu$m, a length of 120 $\mu$m and a thickness of 80 nm. By using the transparent material, the decrease of aperture ratio by the conducive members can be prevented and the viewing angle characteristics which are symmetric in an up and down direction as well as in a left and right direction can be realized and hence, the front face transmitted light amount at the ON state (at the time of the white display) can be enhanced.

Further, although the conductive member 1 is made of chromium having a width of 1 $\mu$m, a length of 120 $\mu$m and a thickness of 80 nm in the embodiment 1, the conductive member 1 may be formed of chromium having a width of 3 $\mu$m, a length of 120 $\mu$m and a thickness of 80 nm. In this case, although the front face transmitted light amount at the ON state (at the time of white display) may be decreased by approximately 15%, the viewing angle characteristics which are symmetric in an up and down direction as well as in a left and right direction can be realized as in the case of the embodiment 1.

Figure 9:
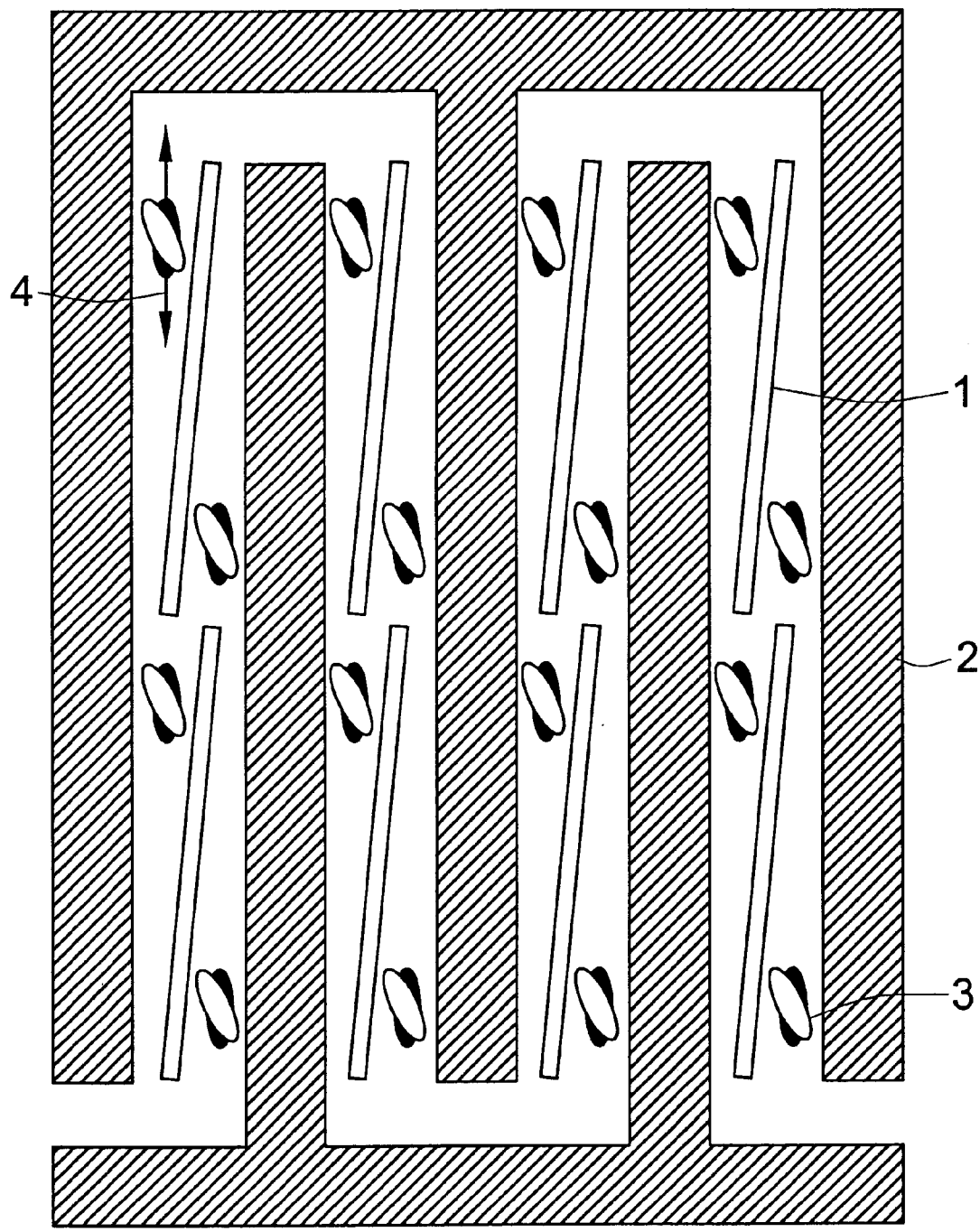
FIG. 9 is a schematic view showing a pixel portion of the liquid crystal display device of the present invention.

Further, although a plurality of conductive members 1 sandwich the comb-like electrode and are formed in the symmetric directions in the embodiment 1, as shown in FIG. 9, the conductive members 1 may be formed in the same direction within the pixel and can realize the viewing angle characteristics which are symmetric in an up and down direction as well as in a left and right direction as in the case of the embodiment 1.

Figure 10:
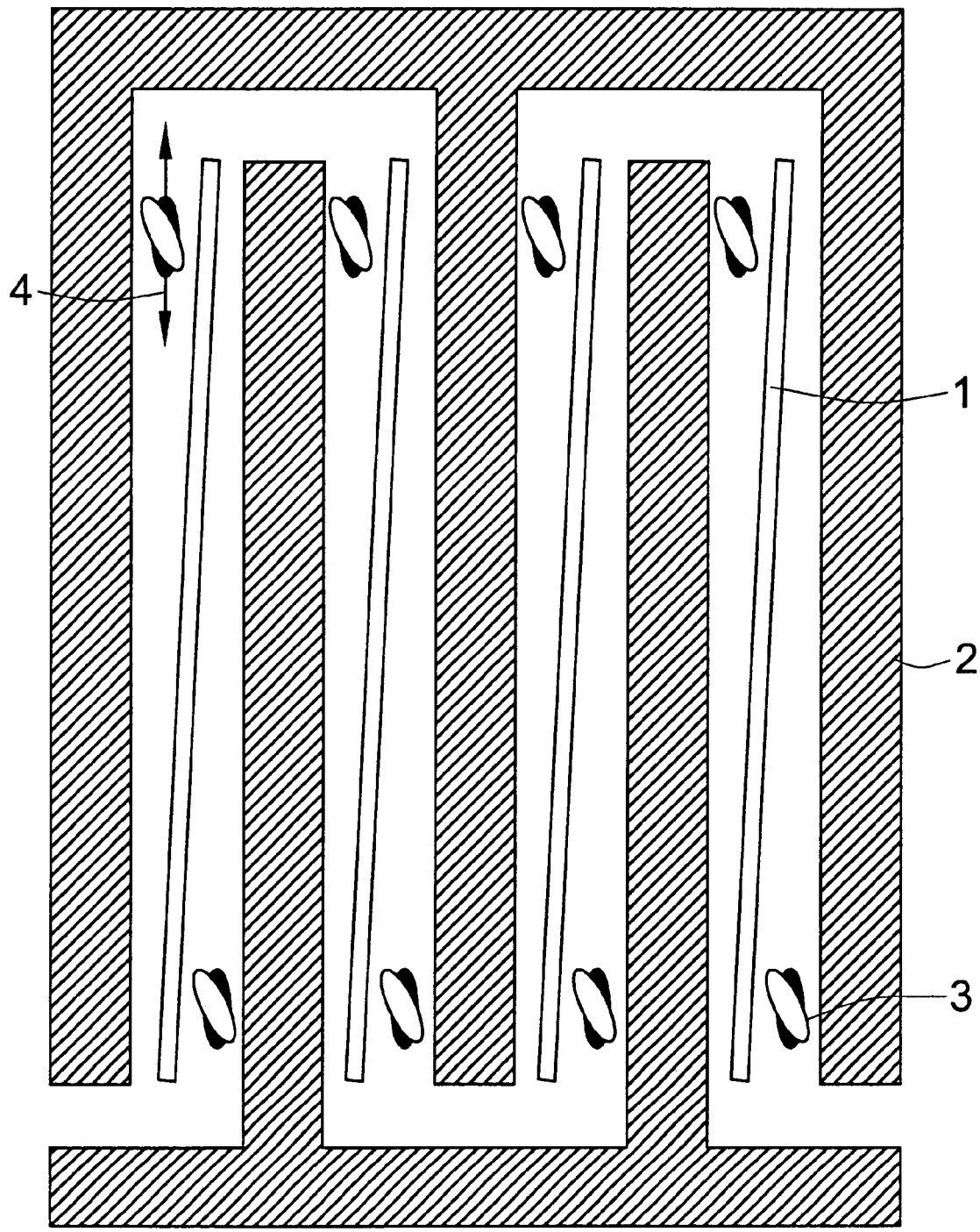
FIG. 10 is a schematic view showing a pixel portion of the liquid crystal display device of the present invention.

As shown in FIG. 10, the shape of the conductive member 1 may be formed of chromium having a width of 1 $\mu$m, a length of 240 $\mu$m and a thickness of 80 nm and an angle which the long side of the conductive member 1 relative to the long side of the comb-like electrode maybe set to 3°. In this case, although there exists a possibility that the intensity of the front face transmitted light at the ON state (at the time of the white display) is reduced by several % due to the disclination in the periphery of the reverse twisting region which occurs in the vicinity of the comb-like electrodes, the symmetric viewing angle characteristics in an up and down direction as well as in a left and right direction can be realized as in the case of the embodiment 1.

Figure 11:
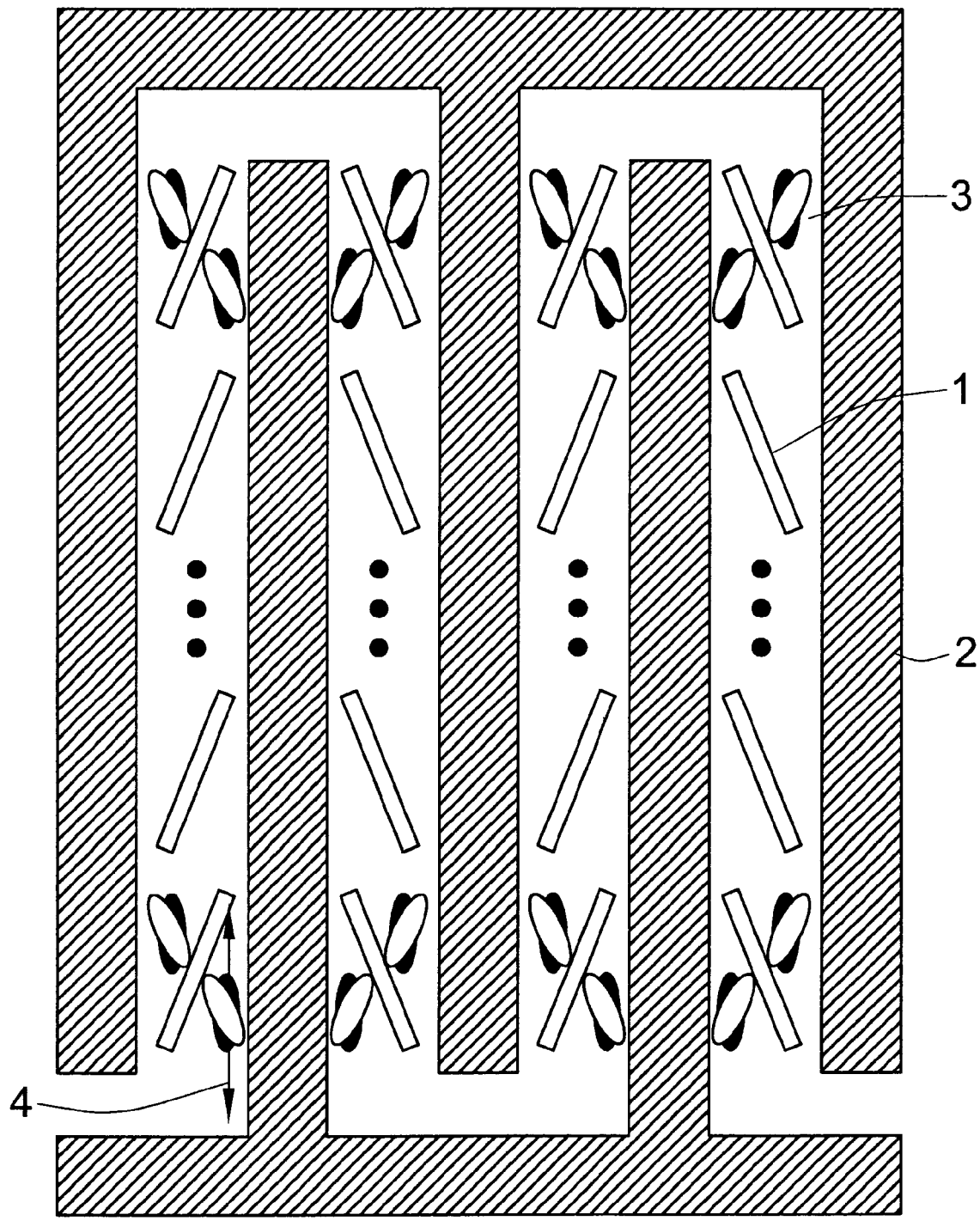
FIG. 11 is a schematic view showing a pixel portion of the liquid crystal display device of the present invention.

Further, as shown in FIG. 11, the shape of the conductive members 1 is formed of a thin line having a width of 1 $\mu$m, a length of 30 $\mu$m and a thickness of 80 nm and an angle which the long side of the conductive member 1 and the long side of the comb-like electrode make may be set to 25°. In this case, although there exists a possibility that the drive voltage is increased by approximately 20%, the viewing angle characteristics which are symmetric in an up and down direction as well as in a left and right direction can be realized as in the case of the embodiment 1.

Further, the shape of the conductive members 1 may be formed of chromium having a width of 1 $\mu$m, a length of 120 $\mu$m and a thickness of 150 nm and the viewing angle characteristics which are symmetric in an up and down direction as well as in a left and right direction can be realized as in the case of the embodiment 1.

Further, as the aligning layer 7, AL3000 made by JSR Ltd. can be used in place of AL1000. In this case, although there exists a possibility that the intensity of the front face transmitted light at the ON state (at the time of the white display) is reduced by several % due to the disclination in the periphery of the reverse twisting region which occurs in the vicinity of the comb-like electrodes, the symmetric viewing angle characteristics in an up and down direction as well as in a left and right direction can be realized as in the case of the embodiment 1.

Further, in this embodiment, although the thickness of the conductive members 1 is set to approximately 80 nm, it has been already confirmed that so long as the thickness of the conductive members 1 is set to approximately not more than 100 nm, the viewing angle characteristics which are symmetric in an up and down direction as well as in a left and right direction can be realized.

Still further, in the above embodiment, when the angle made by the long side of the conductive member 1 and the long side of the comb-like electrode 2 approaches 25°, there is a possibility that the drive voltage of the liquid crystal display device which can realize the viewing angle characteristics which are symmetric in an up and down direction as well as in a left and right direction is elevated by approximately 20%. However, it has been already confirmed that in case the angle which the long side of the conductive member 1 and the long side of the comb-like electrode 2 make is held approximately from 5° to 20°, it substantially does not bring about the elevation of the drive voltage and hence, an effect that the contrast is improved can be obtained.

The liquid crystal display device according to the present invention has the effect that by forming conductive members between the comb-like electrodes, the liquid crystal display device which is capable of suppressing the disclination is obtained.

In the liquid crystal display device according to the present invention, by setting the angle which the long side of the conductive member and the long side of the comb-like electrode make to not less than 5° and not more than 20°, the rubbing treatment direction can be set to a direction parallel to the long side direction of the comb-like electrode and hence, the viewing angle characteristics which are symmetric in an up and down direction as well as in a left and right direction can be realized. Accordingly, the effect that the viewing angle characteristics in the horizontal direction and in the vertical direction which are essential for the display device are improved can be obtained.

In the liquid crystal display device according to the present invention, the conductive member is made of transparent material and hence, the reduction of aperture ratio of the liquid crystal display device which is caused by the conductive member can be suppressed. Accordingly, it gives rise to an effect that the luminance at the time of the white display can be increased so that the high contrast can be obtained.

In the liquid crystal display device according to the present invention, by restricting the width of the conductive member 1 to not more than 3 $\mu$m, even in case the conductive member is made of opaque or non-transparent material, the reduction of aperture ratio of the liquid crystal display device due to the conductive members can be suppressed to approximately not more than 20%. Accordingly, it gives rise to an effect that the luminance at the time of the white display can be increased so that the high contrast can be obtained.

In the liquid crystal display device according to the present invention, the conductive members are formed in a plurality of directions within one pixel and hence, the twisting deformation of the liquid crystal layer can be induced in a plurality of directions within one pixel. Accordingly, it gives rise to an effect that the color change which is generated in the specific viewing directions can be suppressed.

What is claimed is:

1. A liquid crystal display device comprising:
   an electrode substrate including at least first and second elongated electrodes, each elongated electrode having a short side and a long side, the long sides of the first and second elongated electrodes facing each other and being spaced from each other at a distance, the first and second electrodes being electrically isolated from each other so that a potential difference can be established between the first and second electrodes, producing an electric field between the first and second electrodes;
   a counter substrate facing the electrode substrate;
   a liquid crystal material sandwiched between the electrode substrate and the counter substrate; and
   a conductive member for adjusting an electric field between the first and second elongated electrodes to produce a visual display, the conductive member being disposed between the first and second elongated electrodes and electrically isolated from the first and second elongated electrodes.

2. The liquid crystal display device of claim 1, wherein the first and second electrodes are comb-like electrodes including a plurality of the first elongated electrodes and a plurality of the second elongated electrodes as respective tooth portions of first and second comb-like electrodes.

3. The liquid crystal display device of claim 1, wherein the electrode substrate is rubbed in a direction parallel to the long sides of the first and second elongated electrode and the conductive member has an elongated pattern having a tilt angle of not less than 50° and not more than 20° relative to the long sides of the first and second elongated electrodes.

4. The liquid crystal display device of claim 2, wherein the electrode substrate is rubbed in a direction parallel to the long sides of the first and second elongated electrode and the conductive member has an elongated pattern having a tilt angle of not less than 5° and not more than 20° relative to the long sides of the first and second elongated electrodes.

5. The liquid crystal display device of claim 3, including a plurality of the conductive members having elongated patterns with different tilt angles.

6. The liquid crystal display device of claim 4, including a plurality of the conductive members having elongated patterns with different tilt angles.

7. The liquid crystal display device of claim 1, wherein the liquid crystal material is a twistable liquid crystal material.

8. The liquid crystal display device of claim 2, wherein the liquid crystal material is a twistable liquid crystal material.

9. The liquid crystal display device of claim 3, wherein the liquid crystal material is a twistable liquid crystal material.

10. The liquid crystal display device of claim 4, wherein the liquid crystal material is a twistable liquid crystal material.

11. The liquid crystal display device of claim 1, wherein the conductive member is transparent.

12. The liquid crystal display device of claim 2, wherein the conductive member is transparent.

13. The liquid crystal display device of claim 3, wherein the conductive member is transparent.

14. The liquid crystal display device of claim 4, wherein the conductive member is transparent.

15. The liquid crystal display device of claim 1, wherein the conductive member has a width of not more than 3 $\mu$m.

16. The liquid crystal display device of claim 2, wherein the conductive member has a width of not more than 3 $\mu$m.

17. The liquid crystal display device of claim 1, wherein the conductive member has a thickness of not more than 100 nm.

18. The liquid crystal display device of claim 2, wherein the conductive member has a thickness of not more than 100 nm.

19. The liquid crystal display device of claim 1, wherein the liquid crystal material at the electrode substrate has a pretilt angle of not more than 3°.

20. The liquid crystal display device of claim 2, wherein the liquid crystal material at the electrode substrate has a pretilt angle of not more than 3°.

21. The liquid crystal display of claim 1 wherein the conductive member is disposed on the electrode substrate.

22. A liquid crystal display device comprising:

an electrode substrate including at least first and second elongated electrodes, each elongated electrode having a short side and a long side, the long sides of the first and second elongated electrodes facing each other and being spaced from each other at a distance;

a counter substrate facing the electrode substrate;

a liquid crystal material sandwiched between the electrode substrate and the counter substrate; and a conductive member for adjusting an electric field between the first and second elongated electrodes to produce a visual display, the conductive member being disposed between the first and second elongated electrodes and electrically isolated from the first and second elongated electrodes.

* * * * *

UNITED STATES PATENT AND TRADEMARK OFFICE
CERTIFICATE OF CORRECTION

PATENT NO. : 6,392,731 B1
DATED : December 4, 2001
INVENTOR(S) : Satake et al.

It is certified that error appears in the above-identified patent and that said Letters Patent is hereby corrected as shown below:

Column 3,
Line 39, delete "j".

Column 9,
Line 5, change "50º" to -- 5º --.

Signed and Sealed this

Seventh Day of January, 2003

JAMES E. ROGAN
*Director of the United States Patent and Trademark Office*